United States Patent
Giurca et al.

(10) Patent No.: US 12,043,419 B2
(45) Date of Patent: Jul. 23, 2024

(54) AIRCRAFT WITH VERTICAL TAKE-OFF AND LANDING—VTOL

(71) Applicants: Liviu Grigorian Giurca, Craiova (RO); THE SUMMIT TRUST, Norton Shores, MI (US)

(72) Inventors: Liviu Grigorian Giurca, Craiova (RO); Michael Silviu Soimar, Norton Shores, MI (US)

(73) Assignees: Liviu Giurca, Craiova (RO); THE SUMMIT TRUST, Norton Shores, MI (US)

( * ) Notice: Subject to any disclaimer, the term of this patent is extended or adjusted under 35 U.S.C. 154(b) by 9 days.

(21) Appl. No.: 17/158,833

(22) Filed: Jan. 26, 2021

(65) Prior Publication Data

US 2021/0362855 A1 Nov. 25, 2021

Related U.S. Application Data

(60) Provisional application No. 62/982,198, filed on Feb. 27, 2020.

(51) Int. Cl.
 *B64U 10/20* (2023.01)
 *A61G 1/06* (2006.01)
 (Continued)

(52) U.S. Cl.
 CPC ............... *B64U 10/20* (2023.01); *A61G 1/06* (2013.01); *B64C 29/0025* (2013.01); *B64C 39/04* (2013.01); *B64C 39/08* (2013.01); *B64U 50/19* (2023.01); *B64U 60/10* (2023.01); *B64U 2101/58* (2023.01); *B64U 2101/60* (2023.01)

(58) Field of Classification Search
 CPC ............ B64C 29/0008; B64C 29/0016; B64C 29/0025; B64C 29/02; B64C 39/08; B64U 30/00; B64U 30/20; B64U 30/29; B64U 50/13; B64U 2101/60; B64U 2101/61; B64U 2101/64
 See application file for complete search history.

(56) References Cited

U.S. PATENT DOCUMENTS 5,195,702 A 3/1993 Malvestuto, Jr.
9,868,524 B2 1/2018 Welsh et al.
(Continued)

OTHER PUBLICATIONS

"Technology for Aircraft", Turbo Wing, pp. 1-30.

*Primary Examiner* — Joshua J Michener
*Assistant Examiner* — Ka Chun Leung
(74) *Attorney, Agent, or Firm* — Carter, DeLuca & Farrell, LLP; George Likourezos

(57) ABSTRACT

The invention refers to a VTOL aircraft of the type that uses certain aerodynamic phenomena to increase the lifting force and to reduce the thrust/weight ratio. An aircraft 1 uses a propulsion system 2 consisting of four thrust producing elements, two in front 3 and two in rear 4. Each front thrust producing element 3 contains at least one front rotor 5 operated by at least one front electric motor, fixed on a fuselage 10. Each rear thrust producing element 4 contains at least one rear rotor 7 driven by at least a rear electric motor 8, fixed on the fuselage 10. On the fuselage 10 is attached symmetrically a front wing 12. On the fuselage 10 is attached symmetrically a rear wing 13. The wing 12 and 13 are used also in static conditions respectively in take-off and landing.

22 Claims, 12 Drawing Sheets

(51) Int. Cl.
　　　*B64C 29/00*　　　(2006.01)
　　　*B64C 39/04*　　　(2006.01)
　　　*B64C 39/08*　　　(2006.01)
　　　*B64U 50/19*　　　(2023.01)
　　　*B64U 60/10*　　　(2023.01)
　　　*B64U 101/58*　　(2023.01)
　　　*B64U 101/60*　　(2023.01)

(56)　　　　　　　　References Cited

U.S. PATENT DOCUMENTS

| | | | |
|---|---|---|---|
| 2006/0151666 A1* | 7/2006 | VanderMey | B64C 29/0016 |
| | | | 244/12.3 |
| 2011/0042509 A1* | 2/2011 | Bevirt | B64C 29/0033 |
| | | | 244/12.4 |
| 2012/0012692 A1* | 1/2012 | Kroo | B64C 29/0025 |
| | | | 244/6 |
| 2013/0026303 A1* | 1/2013 | Wang | B64C 29/0033 |
| | | | 244/7 R |
| 2017/0283048 A1 | 10/2017 | Beckman et al. | |
| 2017/0327218 A1* | 11/2017 | Morin | B64C 39/024 |
| 2018/0290736 A1* | 10/2018 | Mikic | B64C 27/26 |
| 2018/0305005 A1* | 10/2018 | Parks | B64D 27/24 |
| 2020/0115045 A1* | 4/2020 | Mermoz | B64D 27/24 |
| 2020/0317332 A1* | 10/2020 | Didey | B64C 39/08 |

* cited by examiner

AIRCRAFT WITH VERTICAL TAKE-OFF AND LANDING—VTOL

CROSS-REFERENCE TO RELATED APPLICATIONS

This application claims the benefit of U.S. Provisional Application No. 62/982,198, filed Feb. 27, 2020, which is hereby incorporated by reference in its entirety.

TECHNICAL FIELD

The invention refers to an aircraft with vertical take-off and landing—VTOL of the type that uses certain aerodynamic phenomena to increase the lifting force and to reduce the thrust/weight ratio.

BACKGROUND

Numerous efforts have been made to design an aircraft for vertical take-off and landing as in the patent application US 20170283048 A1. This aircraft uses different rotors for vertical and forward flight. As a result, during the forward flight phase, which duration is the longest, most electric motors are not used. This dead mass of the vertical lift electric motors increases the complexity and cost of the construction being not useful for 98% of the operation time of the aircraft.

A similar solution with the same disadvantages is described in the patent application U.S. Pat. No. 9,868,524 B2. In addition, the unprotected rotors can enter in contact with surrounding objects or with the people on the ground, which is a very dangerous behavior.

Others known solutions for aircraft with VTOL capability use tilting wings or tilting rotors. This type of aircraft requires a sophisticated control of the stability respectively of the relative position between the fuselage and the propulsion system that is realized by means of complex and expensive mechanisms. The control becomes even more difficult due to the change of the relative position between the center of pressure and the center of gravity of the aircraft especially during the transition period and due to the condition that the fuselage stays in a horizontal position all the time. Any mistake in this control can cause an undesirable accident. For example, if the pivoting mechanism is locked in the forward flight position, the aircraft can no longer land vertically.

Also, the majority of VTOL aircraft solutions use distributed electric propulsion (DEP) without however using additional aerodynamic phenomena to reduce the traction/weight ratio which in most cases is bigger than one (1.2-1.4).

Therefore, it is desirable for an aircraft to have an efficient flight both vertically and horizontally. It is also necessary that the speed of the aircraft be increased and the range extended. The aircraft must have a simple construction with a high level of redundancy. The rotors must be protected against contact with the material limitations of the surrounding space or with the persons on the ground.

Objectives

The main objective of the invention is to define a new architecture of a propulsion system and an aircraft with vertical take-off and landing that uses a single type of propulsion system for both horizontal and vertical flight and which produces lift even in static conditions.

Another objective of the invention is to reduce the weight of the embarked power sources.

Another objective of the invention is to achieve an aircraft with simplified construction, without actuators for wings, propellers or flaps, but which is fully operational.

Another objective of the invention is to protect the aircraft against the environment limitations.

Another objective of the invention is to avoid the contact of the rotors with the people on the ground.

Another objective of the invention is to increase the efficiency and the speed of the aircraft in forward flight.

Another objective of the invention is to offer a high redundancy level, without single points of failure that can conduct to a catastrophic event and can affect passenger integrity.

SUMMARY

It is an aspect of this disclosure herein to provide an improved aerial vehicle, having VTOL capability, in particular with respect to aerodynamic properties and/or maneuverability for cargo and passenger transportation.

The aerial vehicle according with this disclosure is represented by an aircraft with vertical take-off and landing that uses a propulsion system consisting of at least four thrust producing elements, respectively two at front and two at the rear. Each thrust producing element uses at least one rotor driven by at least one electric motor. The rotation plane of the front and rear rotors is considered to be substantially horizontal or slightly inclined when the aircraft is in a static/horizontally position. The electric motors are attached by means of some supports on both sides of a fuselage. On the front of the fuselage, a front wing is symmetrically attached. The front wing has an unmodifiable angle between 15° and 80°, measured when the aircraft is in a static position. On the rear of the fuselage, a rear wing is symmetrically attached. The rear wing has an unmodifiable angle between 15° and 80°, measured when the aircraft is in a static position. Both the front wing and the rear wing have two jet limiters at the ends. The front wing is positioned so that the rotational planes of the front rotors are located near the trailing edge of the front wing and above its upper surface. The rear wing is positioned so that the rotational planes of the rear rotors are located near the leading edge of the rear wing and below its lower surface.

In a first constructive variant, the diameters of the front rotors are equal with the diameters of the rear rotors.

In another constructive variant, the diameters of the front rotors are larger than the diameters of the rear rotors.

According to another aspect of the invention, a method of producing the vertical lift of the aircraft consists of acting the front rotors which produce a significant depression on the front wing and this contributes to increase the vertical thrust force. At the same time, the rear rotors are operated to produce an increased pressure on the rear wing lower surface and this contributes to increase of the vertical thrust force.

According to another aspect of the invention, a method of controlling the passage from vertical to forward flight and vice versa is achieved by varying the rotational speed of the rotors located at the rear compared with the rotational speed of the rotors located at the front, which causes the pitch angle change of the aircraft.

In various constructive variants the aircraft according to the invention can carry various load and passengers, or it can be used for aerial surveillance/imaging.

The aircraft according to the invention is a convenient and safe mean of transporting people and various loads between two locations without special infrastructure accommodations. As designed, the aircraft is stable in flight and has a compact size, so that the footprint on the ground and the required area of ground storage are minimal. The propulsion efficiency is improved in the vertical flight due to the component generated by the depression on the front wing and the increased pressure lower the rear wing exerted even under static conditions. The efficiency of the propulsion is improved in the forward flight due to the lift created by the front and rear wings. The lack of actuators for the propulsion system or for wings simplifies the construction and reduces the cost of the product.

BRIEF DESCRIPTION OF THE DRAWINGS

Several examples of carrying out are described in relation with the FIGS. 1, 2, 3, 4, 5, 6, 7, 8, 9, 10, 11, 12, 13, 14, 15, 16, 17, 18, 19, 20, 21, 22, 23, 24, 25, 26, 27 and 28 which represent.

DETAILED DESCRIPTION

Figure 1:
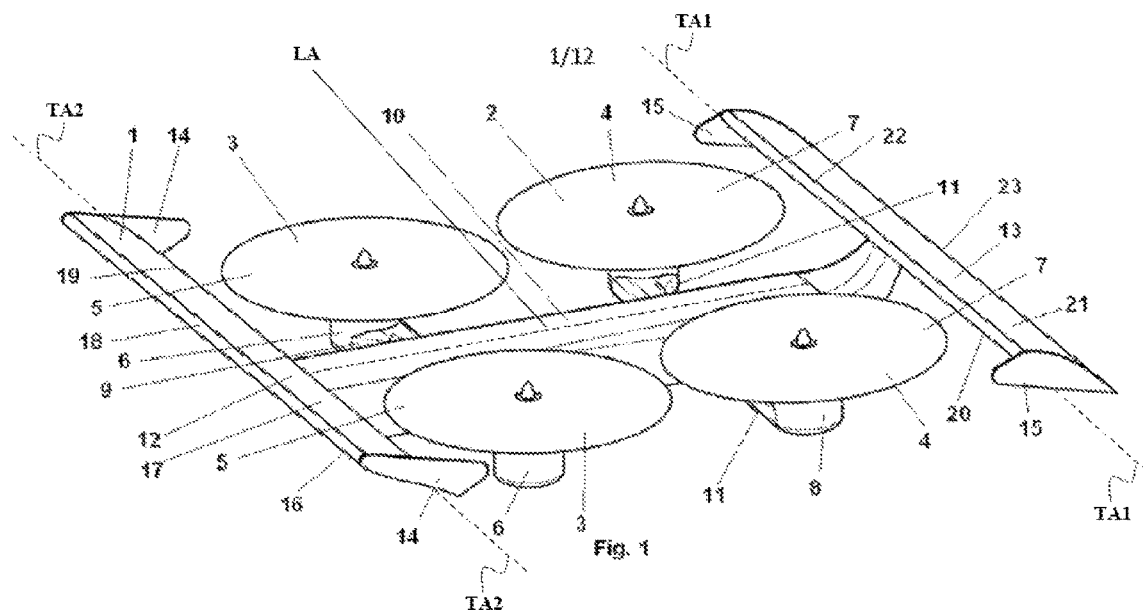
FIG. 1, an isometric view from the front of an aircraft, of a drone type, in the take-off or landing phase.
Figure 2:
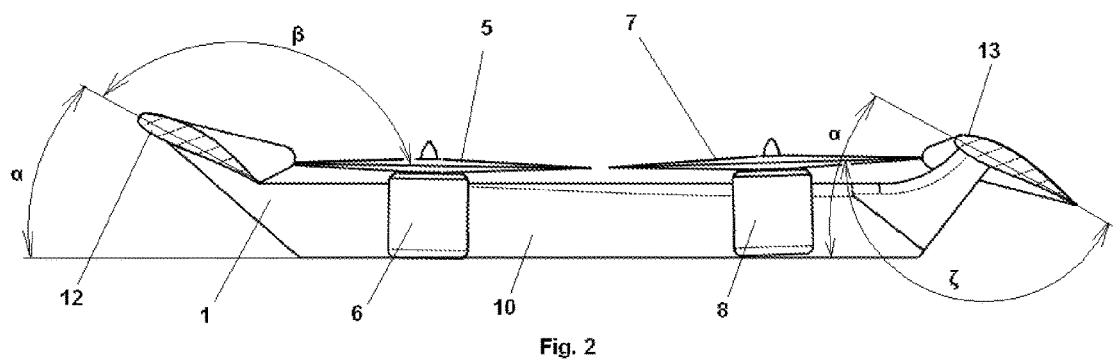
FIG. 2, a longitudinal section through the aircraft from FIG. 1 in the take-off or landing phase.
Figure 3:
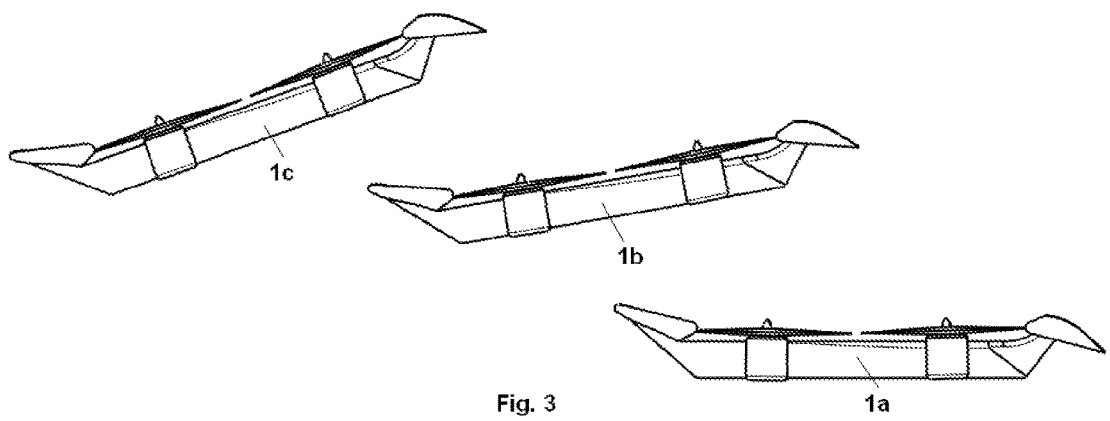
FIG. 3, a representation of the flight sequences of the aircraft shown in FIG. 1.
Figure 4:
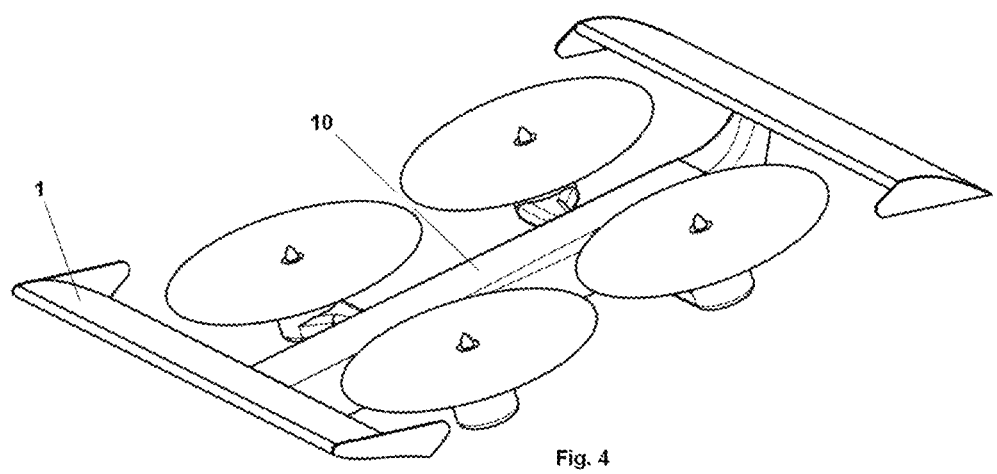
FIG. 4, an isometric view from the front of the aircraft of FIG. 1 in the transition phase.
Figure 5:
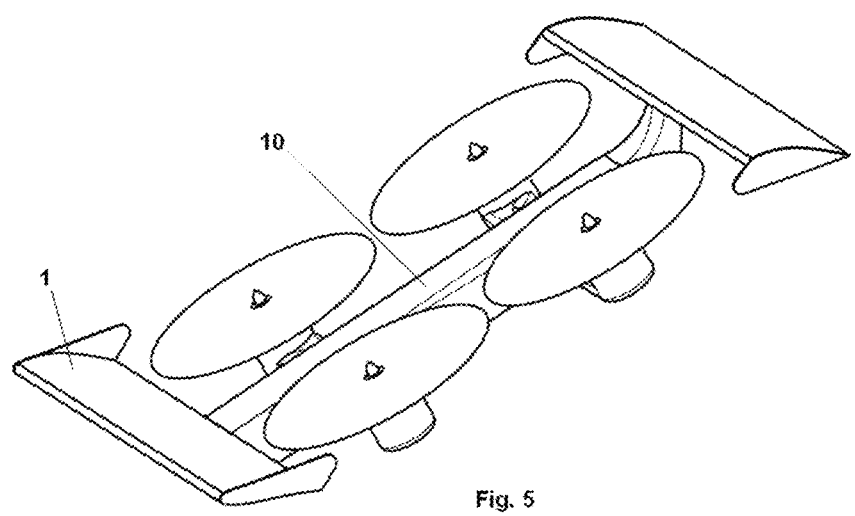
FIG. 5, an isometric view from the front of the aircraft shown in FIG. 1 in the forward flight phase.
Figure 6:
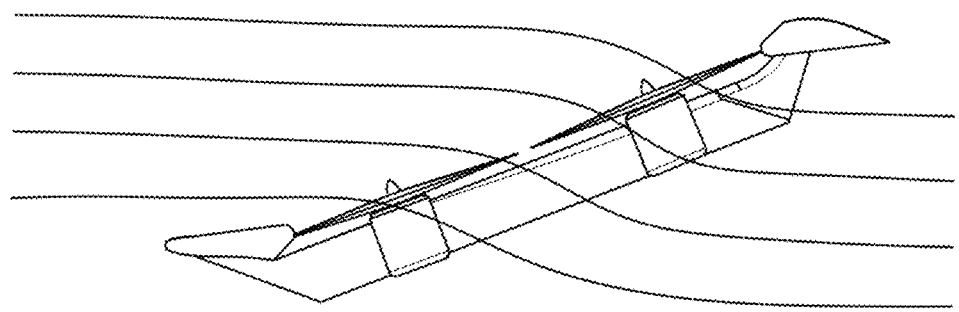
FIG. 6, a representation of the airflow that crosses the aircraft shown FIG. 1 during the forward flight.

In a first embodiment, an aircraft 1, with vertical takeoff and landing, of a drone type, uses a propulsion system 2 consisting of four thrust producing elements, two in front 3 and two in rear 4 as in FIGS. 1, 2, 3, 4, 5 and 6. Each front thrust producing element 3 contains at least one front rotor 5 operated by at least one front electric motor 6. Each rear thrust producing element 4 contains at least one rear rotor 7 driven by at least a rear electric motor 8. The rotation plane of the front and rear rotors 5 and 7 is considered substantially horizontal or slightly inclined when the aircraft 1 is in a static position. The front electric motors 6 are attached by means of supports 9 on both sides of a fuselage 10. Similarly, the rear electric motors 8 are attached by means of supports 11 on both sides of the fuselage 10. The fuselage 10 defines a vertical plane LA (FIG. 1). The vertical plane is transverse to horizontal planes TA1 and TA2. On the fuselage 10, at the front is attached symmetrically a front wing 12. The front wing 12 is positioned at a fixed angle a between 15° and 80° with the horizontal plane TA2 when the aircraft 1 is in a static position. On the fuselage 10, at the rear is attached symmetrically a rear wing 13. The rear wing 13 is positioned at a fixed angle a between 15° and 80° with the horizontal plane TA1 when the aircraft 1 is in a static position. The front wing 12 has two jet limiters 14 at its ends. The rear wing 13 has two jet limiters 15 at its ends. The jet limiters 14 and 15 limits the flow developed by the front and rear rotors 5 and 7. The front wing 12 uses an aerodynamic profile which has a lower surface 16, an upper surface 17, a leading edge 18 and a trailing edge 19. The rear wing 13 uses an aerodynamic profile which has a lower surface 20, an upper surface 21, a leading edge 22 and a trailing edge 23. The front wing 12 is so positioned that the rotational planes of the front rotors 5 are located near the trailing edge 19 and above the upper surface 17. The rotational planes of the front rotors 5 is positioned in rapport with the front wing 12 at a fixed angle between 110° and 160°. The rear wing 13 is so positioned that the rotation planes of the rear rotors 7 are located near the leading edge 22 and below the lower surface 20. The rotational planes of the rear rotors 7 is positioned in rapport with the rear wing 13 at a fixed angle between 110° and 160°. In operation, when taking off/landing, respectively when the front electric motors 6 are activated, the front rotors 5 produce a major depression on the upper surface 17 of the front wing 12 and this contributes to increase the vertical thrust force. At the same time, the rear rotors 7 are operated which produce an increased pressure under lower surface 20 of the rear wing 13 and this contributes to the increase the vertical thrust force, which corresponds to the position 1a of the aircraft 1 shown in FIG. 3. The transition from the vertical flight to the horizontal flight is gradually performed during the transition period by varying the rotation speed of the rear rotors 7 with respect to the front rotors 5, which produces the change of the pitch angle of the aircraft 1 and corresponds to the position 1 b of the aircraft 1 from the FIG. 3. The rear rotors 7 are further accelerated until the front wing 12 and the rear wing 13 reach an optimal angle of attack and the aircraft 1 reaches the horizontal cruise speed. In this case, the lift is transferred mainly to the front wings 12 and the rear wing 13 which corresponds to a position 1e of the aircraft 1 shown in FIG. 3. The air flow direction during the forward flight period inside the propulsion system 2 is represented in FIG. 6. In this case it is observed that the operation of the front and the rear wings 12 and 13 is those for blown wings, the airflow being further accelerated on their aerodynamic surfaces by the front and rear rotors 7. The flying path control is performed, as for a quad-rotor drone, by the variation of the rotational speed of the rotors located on the left side in comparison with those located on the right side of the aircraft 1, or vice versa. For an even more precise control of aircraft 1, certain aerodynamic control surfaces (not shown) can be used, such as, for example, flaps.

Figure 7:
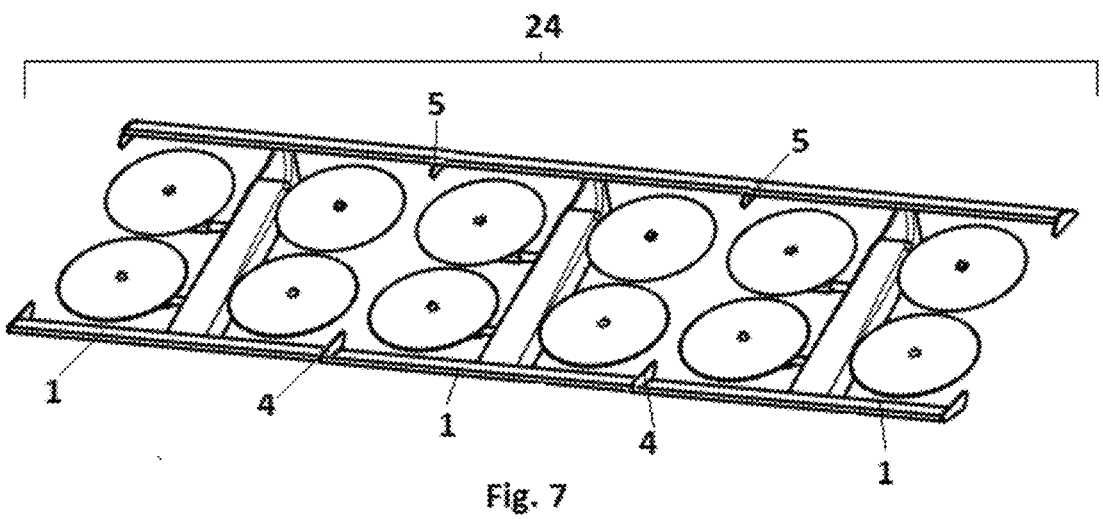
FIG. 7, an isometric view from the front of a compound structure containing three aircraft bodies.

In another embodiment several aircraft 1 structures are joined between jet limiters 4 and 5 forming together a compound structure 24, as shown in FIG. 7. This compound structure 24 can be used to lift heavy loads.

Figure 8:
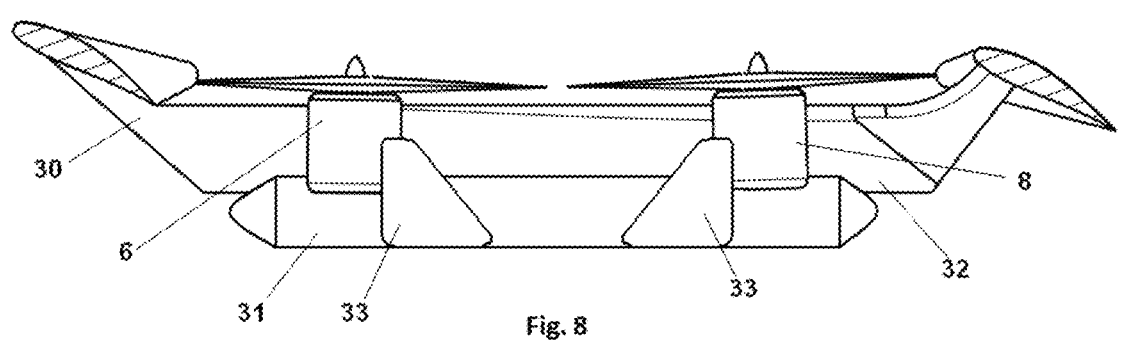
FIG. 8, a longitudinal section through an amphibious aircraft.

In another embodiment, derived from shown in FIG. 1, an aircraft 30, of the amphibious type uses two main floats 31 attached on both sides of a fuselage 32, as shown in FIG. 8. The main floats 31 may could have an elongated cylindrical shape. On the front and the rear of the electric motors 6 and 8 are attached some side floats 33, which are reduced in size compared to the main floats 31. Using the main floats 31 and the side floats 33 the aircraft 30 can take-off and land from and on the water.

Figure 9:
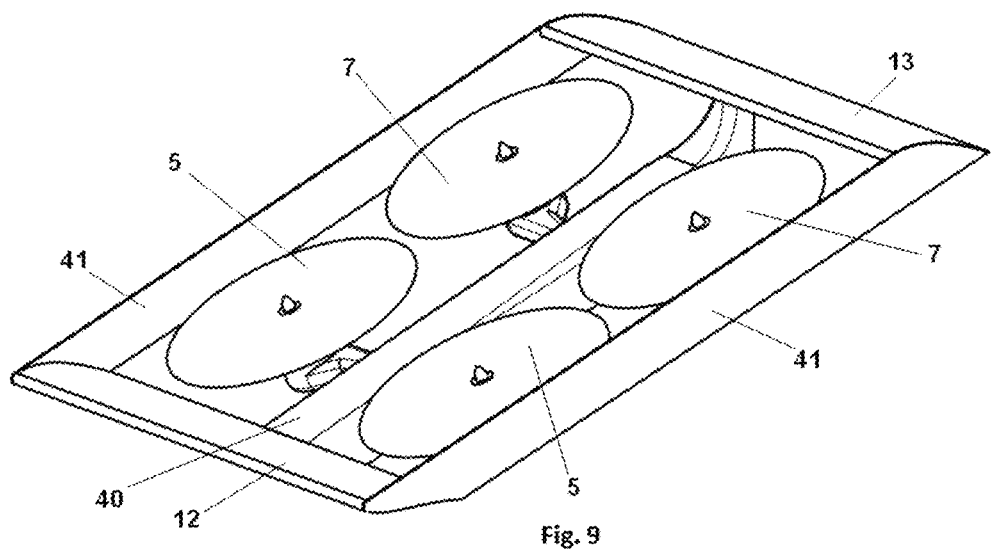
FIG. 9, an isometric view from the front of an aircraft with joined wings.

In another embodiment, derived from that of FIG. 1, an aircraft 40 uses front and rear wings 12 and 13 joined by means of connected straps 41, as shown in FIG. 9. The connected straps 41 offer additional protection to the front and rear rotors 5 and 7. In operation the connected straps 41 also avoid the dispersion of the air flow on the sides of the aircraft 40.

Figure 10:
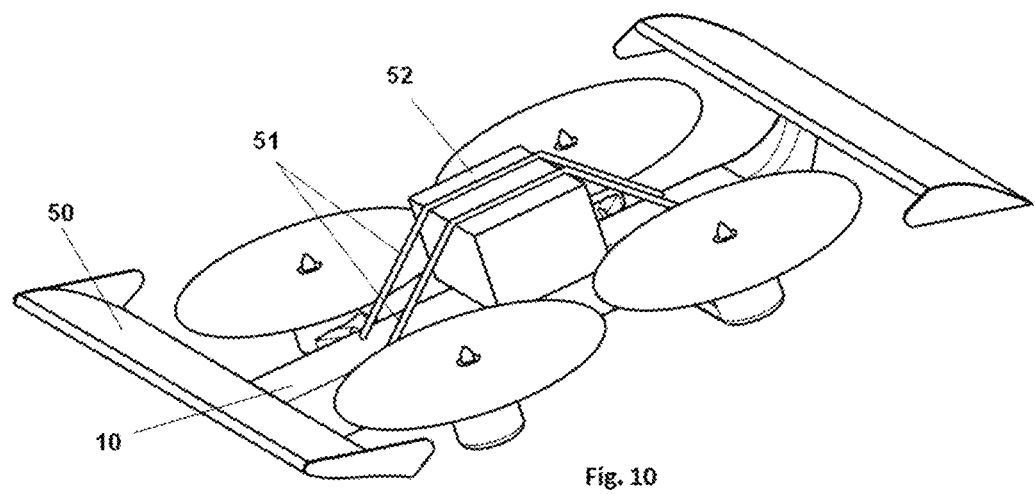
FIG. 10, an isometric view from the front of a delivery aircraft with a package stored above the fuselage.

In another embodiment, derived from that of FIG. 1, an aircraft 50, used for delivery, has attached on the fuselage 10, specifically positioned above fuselage 10, two elastic strings 51, as shown in FIG. 10. The elastic strings 51 can secure for transport of a packet 52, which may have different volumes.

Figure 11:
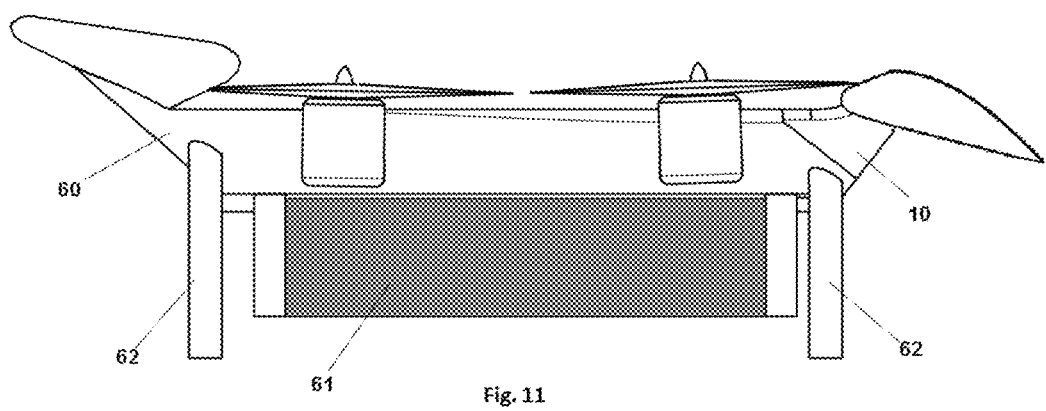
FIG. 11, a side view of a delivery aircraft with a package stored under the fuselage.

In another embodiment, derived from that of FIG. 1, an aircraft 60, used for delivery, has fastened below the fuselage 10 a compartment 61, as shown in FIG. 11. On the fuselage 10 are attached legs 62, which support the landing and which have an aerodynamic profile. Various loads can be stored in the compartment 61. In another embodiment, the compartment 61 is replaced by a parallelepipedic container.

Figure 12:
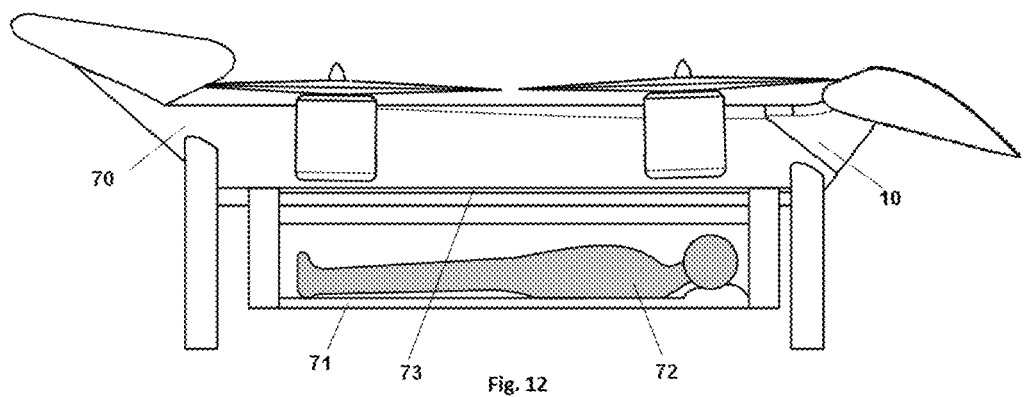
FIG. 12, a side view of an air rescue aircraft.

In another embodiment, derived from that of FIG. 1, an aircraft 70, with a mission transporting injured or sick persons, has attached below the fuselage 10 a stretcher 71, as shown in FIG. 12. The stretcher 71 can carry an injured person 72. The stretcher 71 slides on two guides 73 existent on the fuselage 10. The stretcher 71 could contain the necessary equipment to support the life of the injured person 72.

Figure 13:
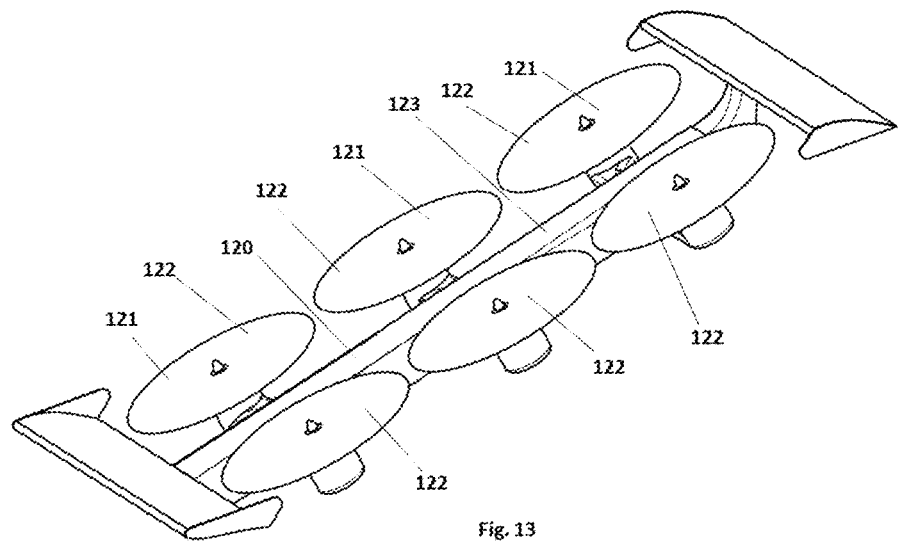
FIG. 13, an isometric view from the front of an aircraft with six rotors in forward flight phase.

In another embodiment, derived from that of FIG. 1, an aircraft 120, designed for various missions, has three pares 121 of thrust producing elements 122, all being attached, symmetrically, side by side from a fuselage 123, as is shown in the FIG. 13. This configuration increases the lift during the take-off and landing phases to accommodate heavier loads. During forward flight some of the thrust producing elements 122 can be deactivated in order to increase the flight efficiency. Also this configuration improves the redundancy level.

Figure 14:
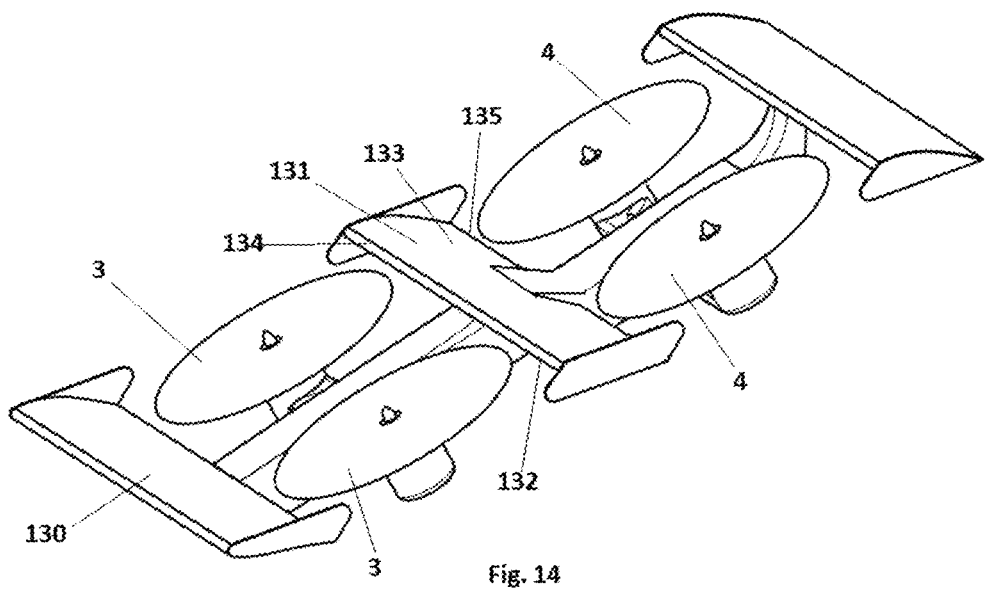
FIG. 14, an isometric view from the front of an aircraft having three parallel wings in forward flight phase.

In another embodiment, derived from that of FIG. 1, an aircraft 130, designed for various missions, uses a third middle wing 131, located between the front thrust producing elements 3 and the rear thrust producing elements 4, as is shown in FIG. 14. The middle wing 131 has an airfoil shape comprised of a lower surface 132, an upper surface 133, a leading edge 134 and a trailing edge 135. In this configuration a supplementary lift is obtained in take-off and landing phases because the front thrust producing elements 3 create an increased pressure on the lower surface 132. Simultaneously the rear thrust producing elements 4 create a depression on the upper surface 133. Also in forward flight the efficiency is improved even at low speed of the aircraft 130 due to the forced air circulation around the middle wing 131.

Figure 15:
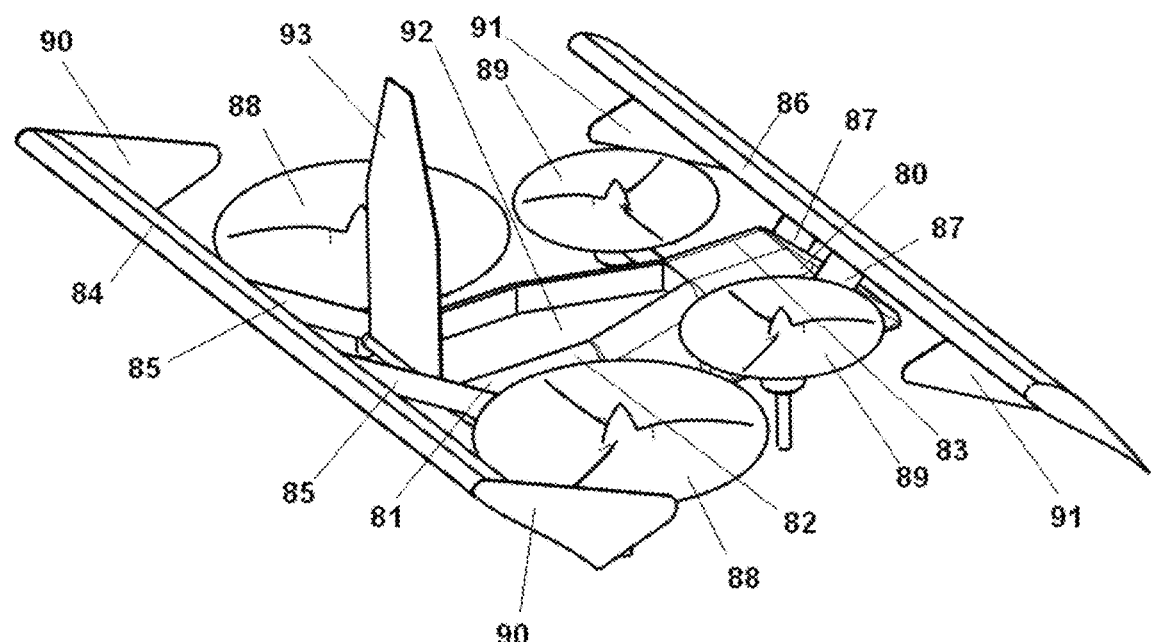
FIG. 15, an isometric view from the front of an aircraft having different size rotors, in the take-off or landing phase.
Figure 16:
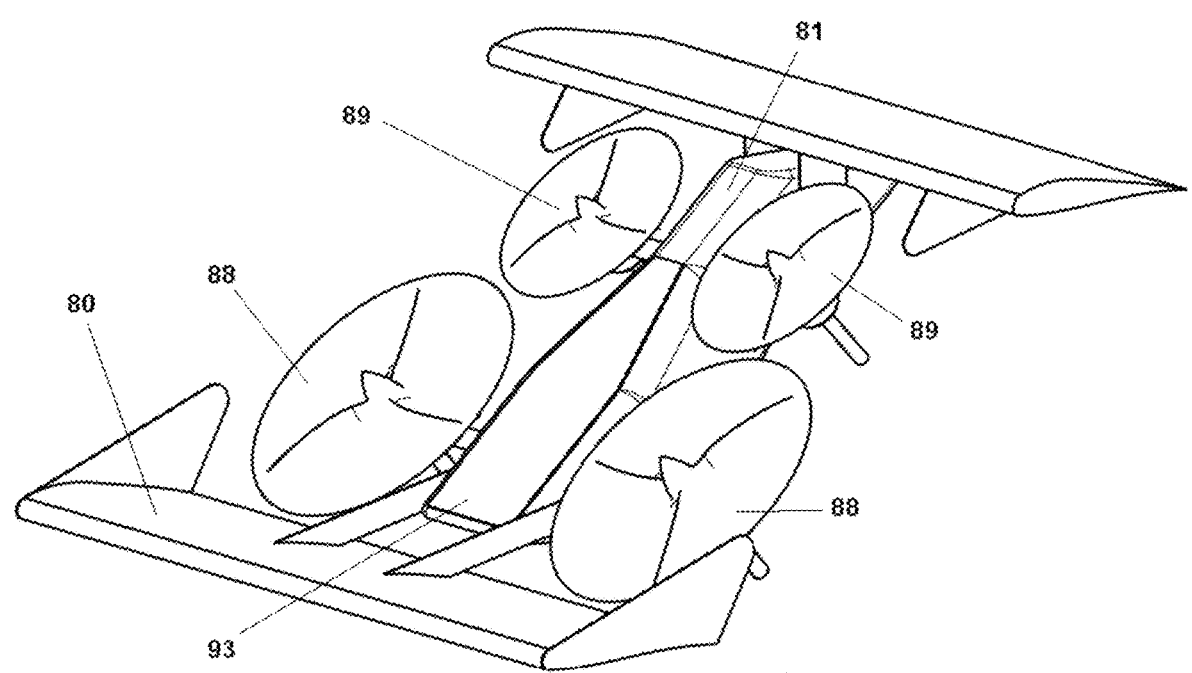
FIG. 16, an isometric view from the front of the aircraft shown in FIG. 15 in the forward flight phase.

In another embodiment, an aircraft 80, of delivery type, uses a fuselage 81, having an enlarged volume 82, at the front and a reduced volume 83, at the rear, as shown in FIGS. 15 and 16. On the fuselage 81 is attached to the front a front wing 84 using two flattened supports 85. The front wing 84 is distanced from the fuselage 81 so that the front air stream can flow between the front wing 84 and the fuselage 81. On the fuselage 81 a rear wing 86 is attached using two flattened supports 87. The rear wing 86 is distanced from the fuselage 81 so that the front stream can flow between the rear wing 86 and the fuselage 81. Several thrust producing elements are attached on the fuselage 81, two in the front 88 and two in the rear 89. The front thrust producing elements 88 are larger in diameter than the rear thrust producing elements 89, due to the fact that the center of gravity of the aircraft 80 is transferred more towards the front. The front wing 84 has two jet limiters 90 at the ends. The rear wing 86 has two jet limiters 91, placed at the end of the rear thrust producing elements 89. The enlarged volume 82 contains an internal compartment 92, which can be closed by a cover 93. In the internal compartment 92 various loads can be transported. During the operation, the rear thrust producing elements 89 create a depression on the upper surface of the fuselage 81, which reduce the drag.

Figure 17:
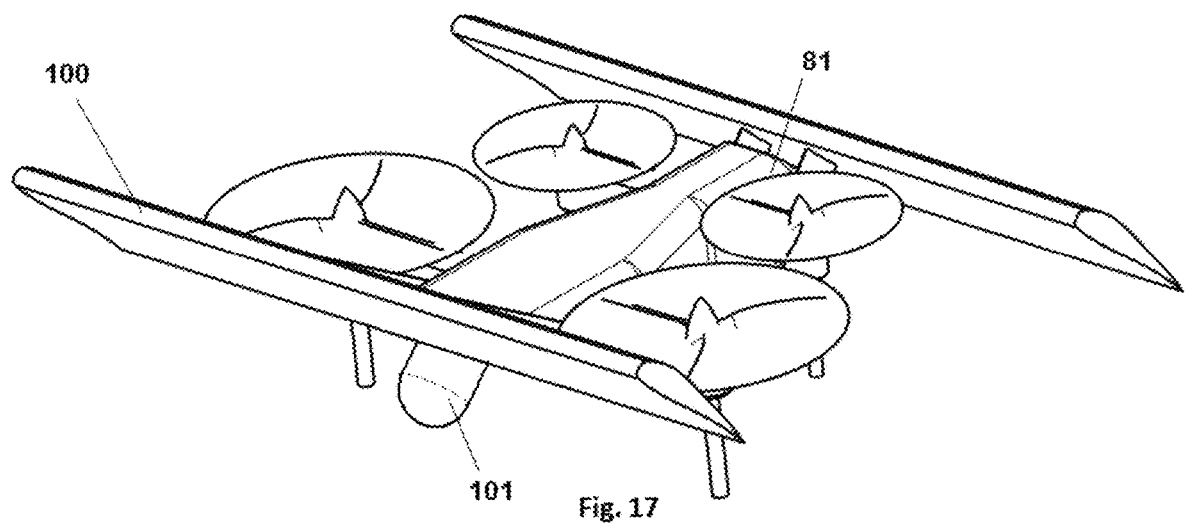
FIG. 17, an isometric view from the front of an aircraft, of surveillance type, in the phase of take-off or landing.
Figure 18:
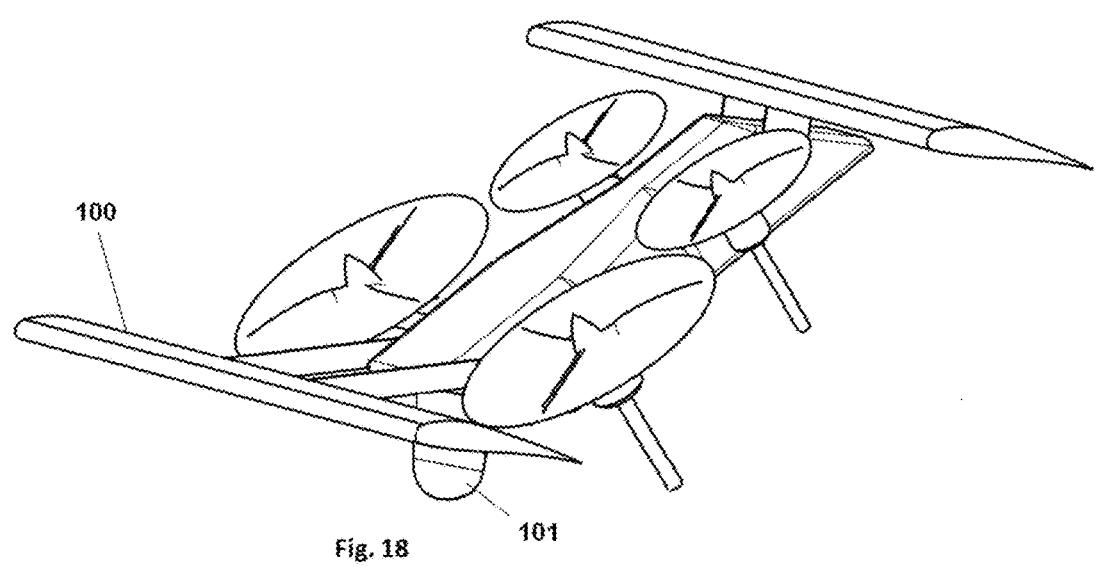
FIG. 18, an isometric view from the front of the aircraft shown in FIG. 17 in the forward flight phase.

In another embodiment derived from that FIG. 14, an aircraft 100, designed for aerial surveillance, has a multi-scanner 101 attached to the front side of the fuselage 81 as is shown in FIGS. 17 and 18. The multi-scanner 101 has could incorporate a number of visual, acoustic and thermal sensors.

Figure 19:
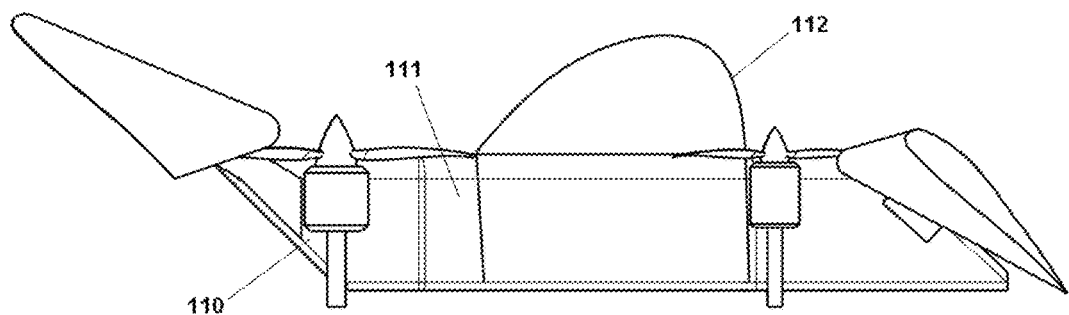
FIG. 19, a side view of a passenger aircraft, in the take-off or landing phase.

In another embodiment, a passenger aircraft 110, with vertical take-off and landing, uses a fuselage 111 which has a cabin 112, positioned in the center of gravity area, as is shown in FIG. 19. The cabin 112 can carry at least one passenger. The aircraft 110 can also be used as a ground-effect vehicle that can fly at a low height above a liquid or solid surface with high efficiency.

Figure 20:
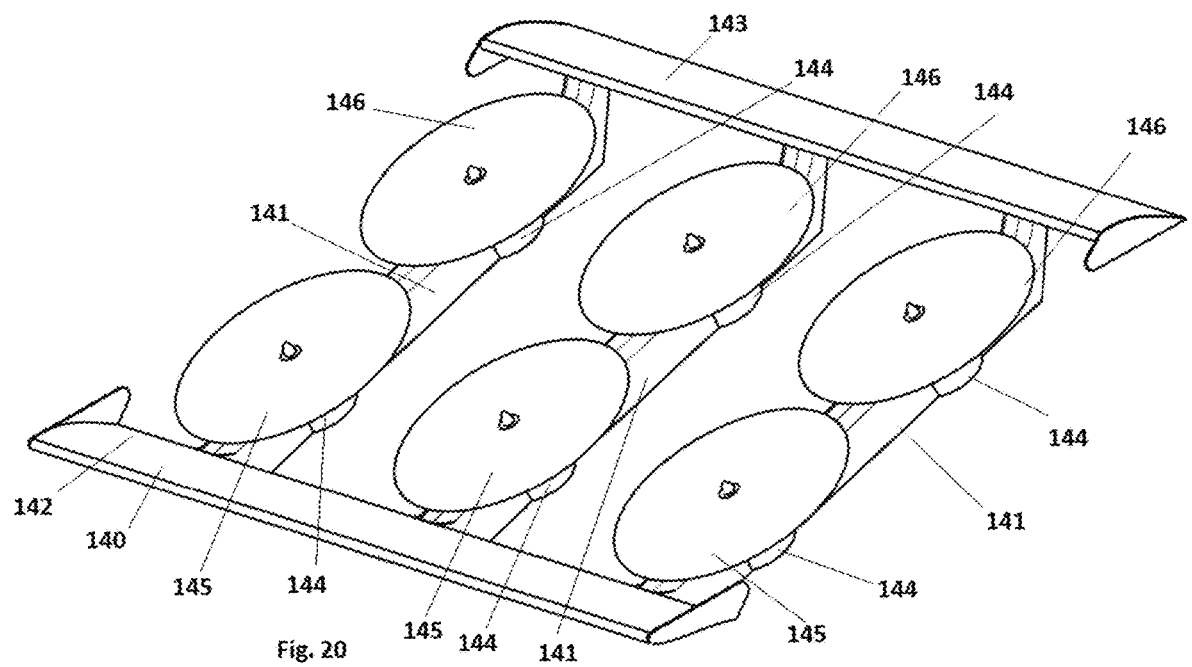
FIG. 20, an isometric view from the front of an aircraft with multiple fuselage in forward flight phase.

In another embodiment, an aircraft 140, of a drone type, uses several fuselages 141, more specifically three fuselages 141 in this example, which connect a front wing 142 with a rear wing 143, as shown in FIG. 20. On each fuselage 141 two thrust producing elements 144 are mounted using supports, one in the front 145 and one in the rear 146. The version with three fuselages 141 has an improved redundancy. In operation during forward flight the front and rear thrust producing elements 145 and 146 located in the middle section of the aircraft 140 can be deactivated to increase the flight efficiency.

Figure 21:
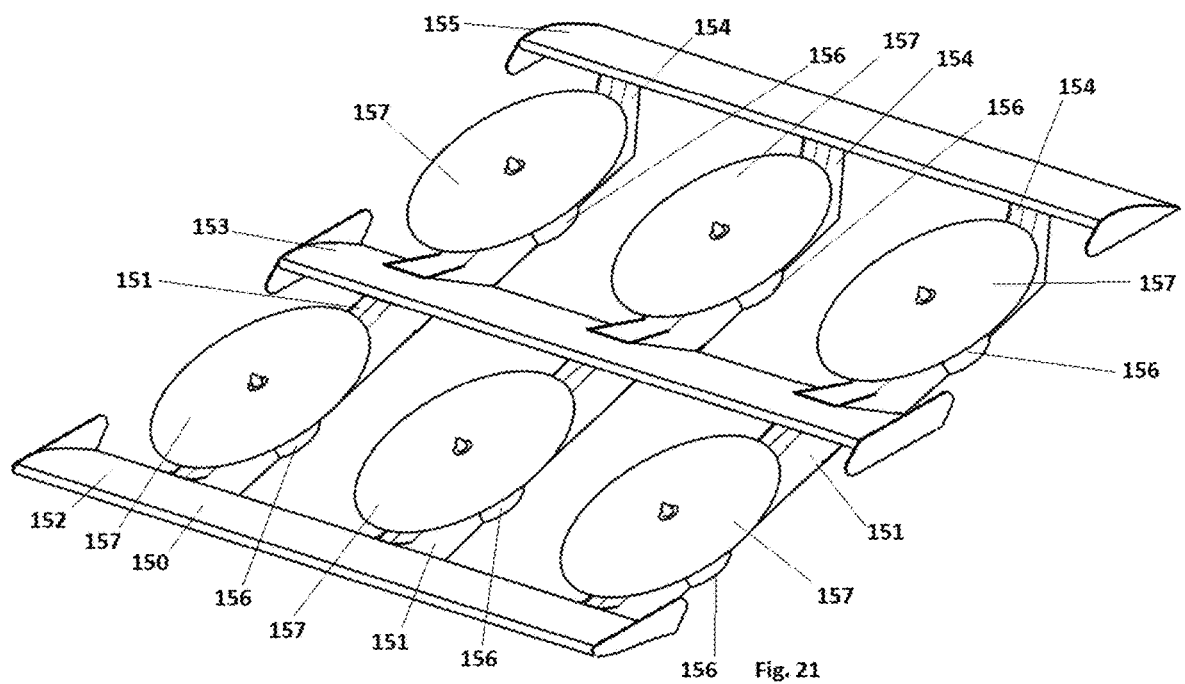
FIG. 21, an isometric view from the front of an aircraft with multiple fuselage and three wings in forward flight phase.

In another embodiment, derived from that of FIG. 20, an aircraft 150, of a drone type, uses several front fuselages 151 which connect a front wing 152 with a middle wing 153, as shown in the FIG. 21. Similarly, the aircraft 150 uses several rear fuselages 154 which connect the middle wing 153 with a rear wing 155. On each front fuselage 151 as well on each rear fuselage 155 a thrust producing element 157 is mounted by means a support 156. The middle wing 153 improves the flight efficiency in both vertical and forward flight.

Figure 22:
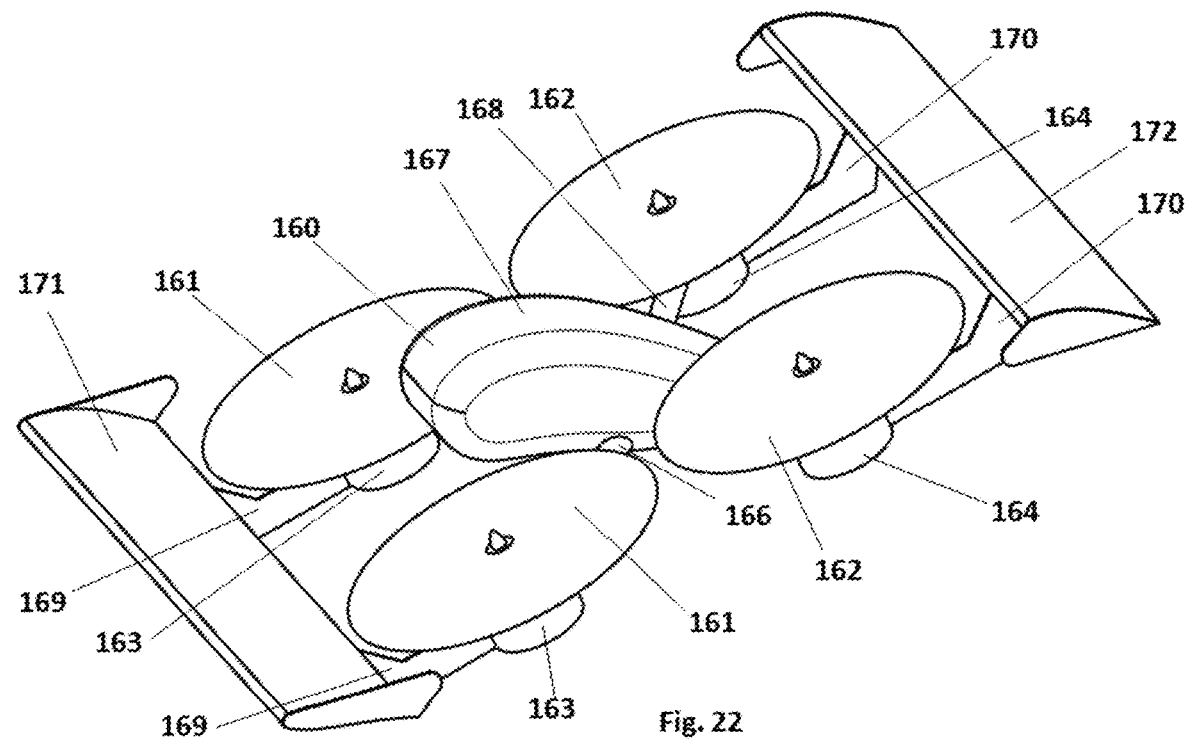
FIG. 22, an isometric view from the front of an aircraft, designed as a delivery drone, having an aerodynamic fuselage in forward flight phase.
Figure 23:
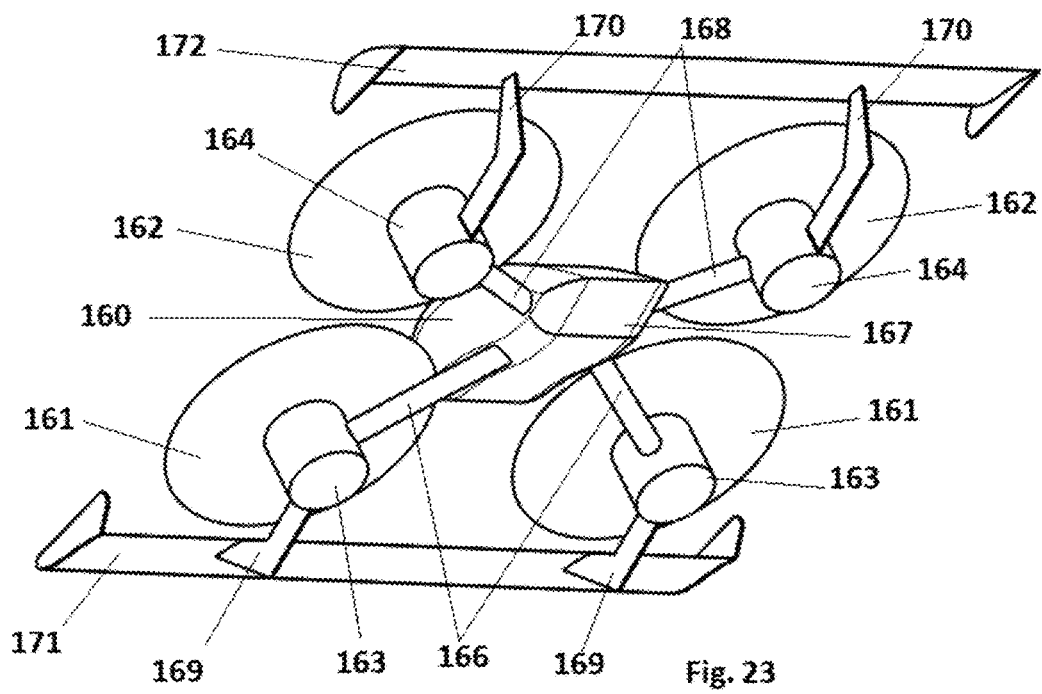
FIG. 23, an isometric view from the rear of the aircraft shown in FIG. 22.

In another embodiment, an aircraft 160, designed mainly for delivery, uses four thrust producing elements, two in front 161 and two in rear 162, secured by two front supports 163 and respectively by two rear supports 164, as shown in FIGS. 22 and 23. The front supports 163 are attached on the fuselage 167 using arms 166. The rear supports 164 are attached on the fuselage 167 using arms 168. The fuselage 167 has an airfoil shape. On each front support 163 is attached a plate 169. On each rear support 164 is attached a plate 170. The two plates 169 sustain a front wing 171. The two plates 170 sustain a rear wing 172. The profile chord of the fuselage 167 is parallel with profile chords of the front and rear wings 171 and 172. During the forward flight the fuselage 167 will have the same angle of attack made with the frontal air flow as the front and rear wings 171 and 172. Because of this configuration, in forward flight, the drag of the aircraft 160 is minimum.

Figure 24:
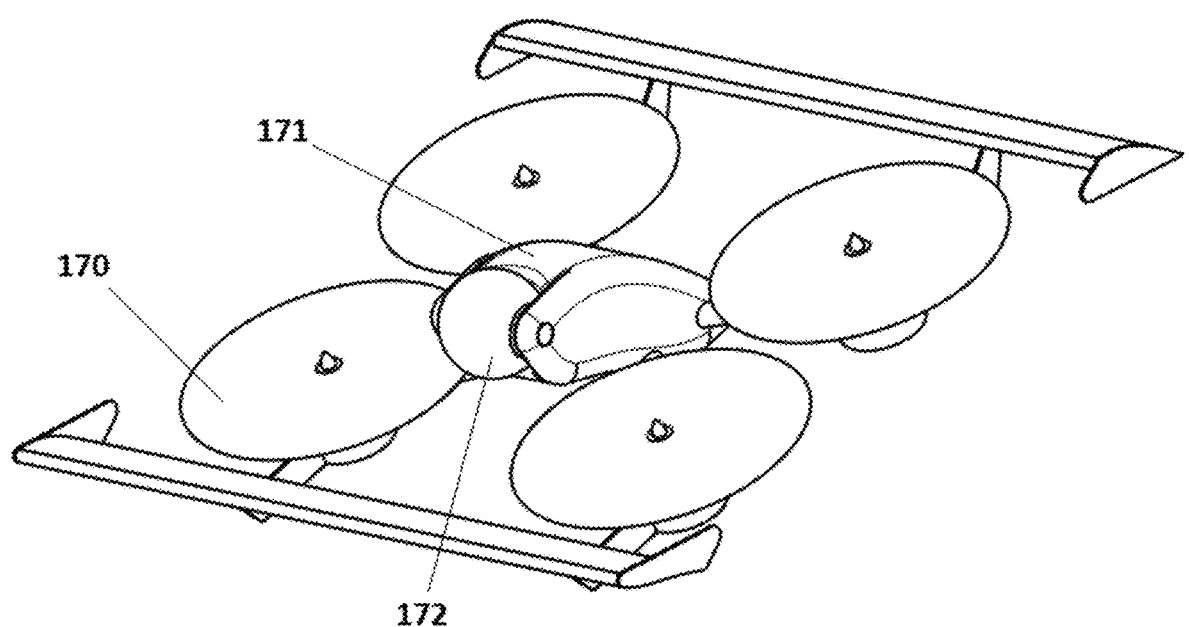
FIG. 24, an isometric view from the front of an aircraft, designed as a surveillance drone, having an aerodynamic fuselage in forward flight phase.

In another embodiment derived from that of the FIG. 22, an aircraft 170, of aerial surveillance, has an aerodynamic fuselage 171, as in the FIG. 24. In the top of the fuselage 171 is mounted a multi-scanner 172. The multi-scanner 172 has incorporated a number of visual, acoustic and thermal sensors.

Figure 25:
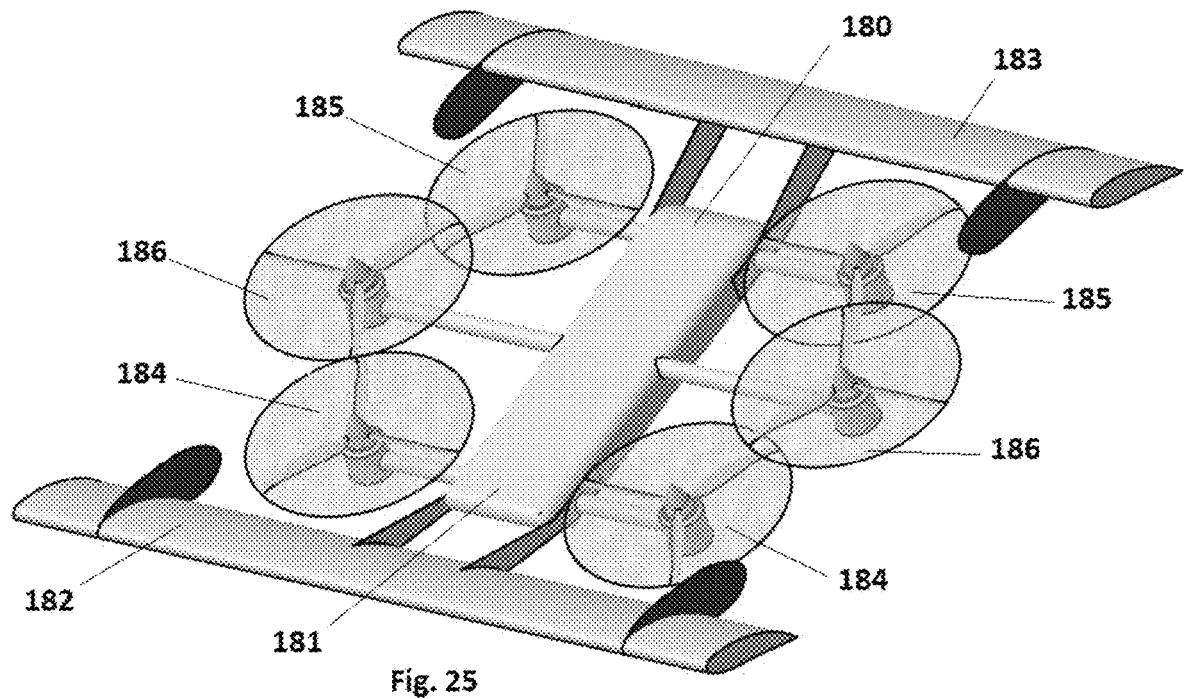
FIG. 25, an isometric view from the front of an aircraft having six superimposed rotors, in forward flight phase.

In another embodiment, derived from that of FIG. 13, an aircraft 180, designed for various missions, have a central fuselage 181 which supports a front wing 182 and a rear wing 183, as is shown in the FIG. 25. On both sides the fuselage 181 are located symmetrically two front rotors 184, two rear rotors 185 and two middle rotors 186. The middle rotors 186 are more distanced from the fuselage 181 when compared to the front rotors 184 and the rear rotors 185. The rotational plane of each middle rotor 186 is partially superimposed over the rotational planes of the corresponding front rotor 184 and rear rotor 185. This configuration reduces the size of the aircraft 180 and increases the air flow by approximately 5%.

Figure 26:
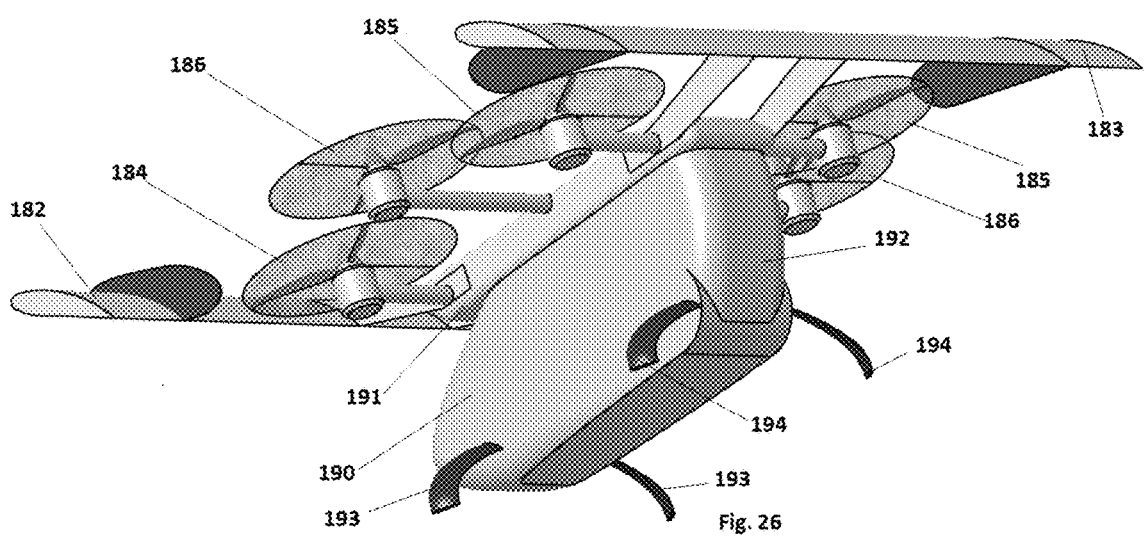
FIG. 26, an isometric view from the rear of an aircraft for passengers having six superimposed rotors, in forward flight phase.

In another embodiment, derived from that of FIG. 25, an aircraft 190, which can transport at least one passenger, has a central fuselage 191, as is shown in FIG. 26. Bellow the fuselage 191 is attached a cabin 192, having an aerodynamic shape. In take-off and landing phases the aircraft 190 is supported by two front legs 193 and by two rear legs 194, all being attached symmetrically on the cabin 192. The front and rear legs 193 and 194 have an airfoil profile, aligned with the wing profiles. The cabin 192 can transport one or more passengers seating on chairs (not shown) which are inclined through the rear so that when the aircraft is in forward flight phase each chair has a substantially vertical position. Also the position of each chair can be adjusted by an actuator (not shown).

Figure 27:
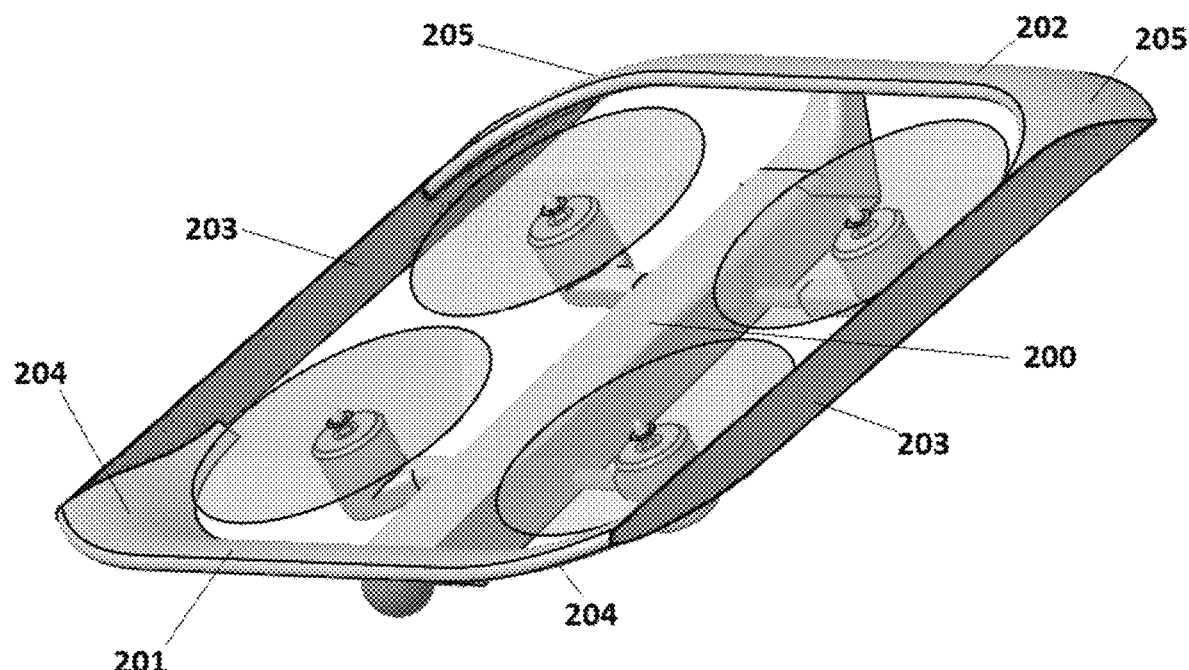
FIG. 27, an isometric view from the front of a reconfigurable aircraft having joined wings, in forward flight phase.
Figure 28:
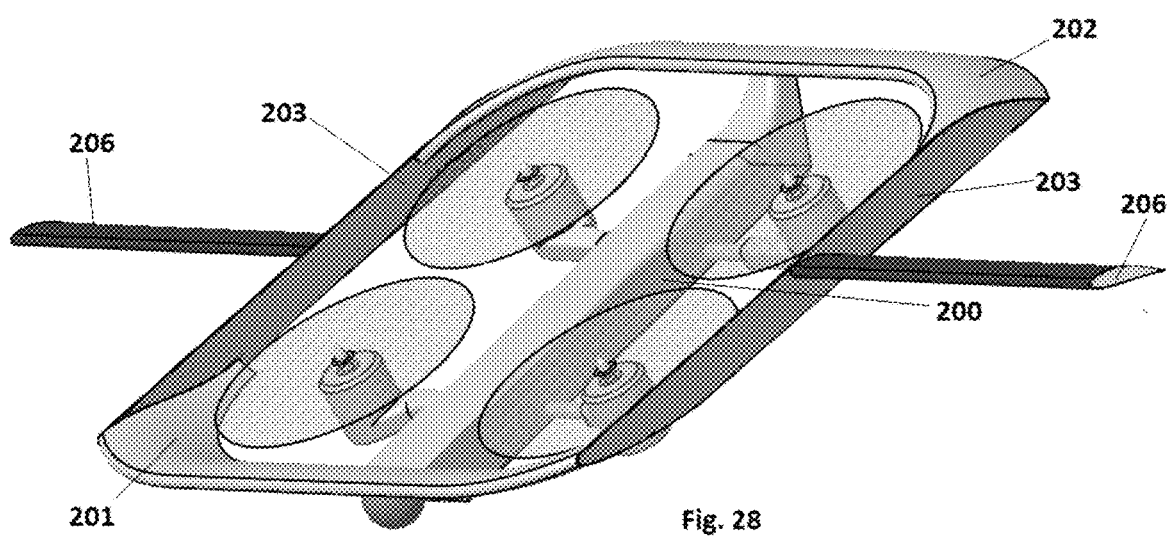
FIG. 28, an isometric view from the front of the aircraft shown in FIG. 27 designed for extended range.

In another embodiment, derived from that of FIG. 9, an aircraft 200, of reconfigurable type, uses some front and rear wings 201 and 202 joined by means of connected straps 203, as shown in FIGS. 27 and 28. The front wing 201 has at its end curved zones 204, oriented backwards and symmetrically disposed, which continue the airfoil profile of the front wing 201. The rear wing 202 has at its ends some curved zones 205, oriented frontally and symmetrically disposed, which continue the airfoil profile of the rear wing 202. This configuration improves the efficiency of the aircraft 200 and creates a continuous rigid structure. The range of the aircraft 200 can be extended by attaching at least two supplementary wings 206 on the connected straps 203, as is shown in the FIG. 28.

Each supplementary wing 206 has an airfoil profile aligned with the airfoil profile of the front and rear wings 201 and 202.

All the described variants can have curved wings as described in FIG. 27.

All the described variants can have in an all-electric version a battery pack as power source for propulsion.

All the described variants can have in a hybrid-electric version a hybrid-electric power source for propulsion.

Any combination between the elements of this disclosure will be considered as being part of the description and of the claims.

What is claimed is:
1. A propulsion system for an aerial vehicle, comprising:
 a fuselage assembly, including:
  a body defining a longitudinal axis; and
  a set of arms extending from the body;
 a front wing disposed on a front section of the fuselage assembly; and
 a rear wing disposed on a rear section of the fuselage assembly,
  wherein the front wing and the rear wing each have an airfoil profile and include an upper surface, a lower surface, a leading edge, and a trailing edge,
  wherein the front wing and the rear wing extend outwards symmetrically from the body in opposing directions, both being inclined at a fixed positive incidence angle ranging from between 15 degrees to 80 degrees relative to the longitudinal axis, the front wing defining a first axis transverse to the longitudinal axis and the rear wing defining a second axis transverse to the longitudinal axis, and
  wherein the front wing and the rear wing each include diametrically opposed jet limiters;
 a thruster assembly configured to generate an airflow, including:
  a plurality of rotors affixed to the arms of the fuselage assembly, the plurality of rotors disposed between the front wing and the rear wing; and
  at least one electric motor configured to power the plurality of rotors,
 wherein a relative position between the fuselage assembly, the front wing, the rear wing, and the thruster assembly remains unchanged during operation of the propulsion system, and
 wherein the plurality of rotors include:
  front rotors affixed to the front section of the fuselage assembly, the front rotors disposed above the upper surface of the front wing and alongside the trailing edge of the front wing; and
  rear rotors affixed to the rear section of the fuselage assembly, the rear rotors disposed below the lower surface of the rear wing and alongside the leading edge of the rear wing.
2. The propulsion system of claim 1, wherein the thruster assembly is configured to generate both vertical thrust and horizontal thrust, the thruster assembly configured to:

in a first phase, generate vertical flight, wherein the thruster assembly produces a greater lifting force than a thrusting force;
in a second phase, generate a transition between vertical flight and horizontal flight, wherein the thruster assembly accelerates a rate of rotation of the rear rotors with respect to the front rotors, altering a pitch angle of the aerial vehicle; and
in a third phase, generate forward horizontal flight, wherein the front wing and the rear wing are each respectively positioned at an optimal angle of attack.

3. The propulsion system of claim 2, wherein producing vertical thrust is configured to:
produce a depression on the upper surface of the front wing, by the front rotors; and
amplify a pressure on the lower surface of the rear wing, by the rear rotors.

4. The propulsion system of claim 3, wherein producing horizontal thrust is configured to:
produce a depression on an upper surface of the fuselage assembly, by the rear rotors; and
amplify a pressure against a lower surface of the fuselage assembly, by the front rotors.

5. The propulsion system of claim 1, wherein the plurality of rotors each define a rotation plane, and wherein an angle between each respective rotation plane and at least one of the front wing and the rear wing ranges from between 110 degrees to 160 degrees.

6. The propulsion system of claim 1, wherein each rotor of the plurality of rotors may selectively be deactivated during operation of the propulsion system to increase an efficiency level of each respective rotor.

7. The propulsion system of claim 1, wherein the fuselage includes a cabin having an aerodynamic shape, the cabin disposed at a center of gravity of the propulsion system.

8. The propulsion system of claim 1, wherein the front and rear wings include diametrically opposed straps, the straps configured to connect respective end portions of the front and rear wings.

9. A propulsion system for aerial vehicle, comprising:
a fuselage assembly, including:
a body defining a longitudinal axis; and
a set of arms extending from the body;
a front wing disposed on a front section of the fuselage assembly;
a rear wing disposed on a rear section of the fuselage assembly; and
diametrically opposed jet limiters having curved profiles, the jet limiters extending inwards towards the arms of the fuselage assembly,
wherein the front wing and the rear wing each have an airfoil profile and a canted cross section, an upper surface, a lower surface, a leading edge, and a trailing edge, and wherein the front wing and the rear wing extend outwards symmetrically from the body in opposing directions, both being inclined at a fixed positive incidence angle ranging from between 15 degrees to 80 degrees relative to the longitudinal axis, the front wing defining a first axis transverse to the longitudinal axis and the rear wing defining a second axis transverse to the longitudinal axis; and
a thruster assembly configured to generate an airflow, including:
a plurality of rotors affixed to the arms of the fuselage assembly, the plurality of rotors disposed between the front wing and the rear wing and including:

a pair of front rotors affixed to a front section of the fuselage assembly, the pair of front rotors disposed above the upper surface and alongside the trailing edge of the front wing; and
a pair of rear rotors affixed to a rear section of the fuselage assembly, the pair of rear rotors disposed below the lower surface and alongside the leading edge of the rear wing, and
wherein a relative position between the fuselage assembly, the front wing, the rear wing, and the thruster assembly remains unchanged during operation of the propulsion system.

10. The propulsion system of claim 9, wherein the thruster assembly is configured to:
in a first phase, generate vertical flight, wherein the thruster assembly produces a greater lifting force than a thrusting force;
in a second phase, generate a transition between vertical flight and horizontal flight, wherein the thruster assembly accelerates a rate of rotation of the pair of rear rotors with respect to the pair of front rotors, altering a pitch angle of the aerial vehicle; and
in a third phase, generate forward horizontal flight, wherein the front wing and the rear wing are each respectively positioned at an optimal angle of attack.

11. The propulsion system of claim 10, wherein the thruster assembly is configured to generate both vertical thrust and horizontal thrust, and
wherein producing vertical thrust causes the propulsion system to:
produce a depression on the upper surface of the front wing, by the pair of front rotors; and
amplify a pressure on the lower surface of the rear wing, by the pair of rear rotors; and
wherein producing horizontal thrust causes the propulsion system to:
produce a depression on an upper surface of the fuselage assembly, by the pair of rear rotors; and
amplify a pressure against a lower surface of the fuselage assembly, by the pair of front rotors.

12. The propulsion system of claim 9, wherein the plurality of rotors each define a rotation plane, and wherein an angle between each respective rotation plane and at least one of the front wing and the rear wing ranges from between 110 degrees to 160 degrees.

13. The propulsion system of claim 9, further comprising a pair of central rotors superimposed between the pair of front rotors and the pair of rear rotors, the pair of central rotors affixed to a central section of the fuselage assembly.

14. The propulsion system of claim 9, further comprising a middle wing disposed on a central section of the fuselage assembly, the middle wing arranged between the pair of front rotors and the pair of rear rotors, wherein the middle wing is positioned at an angle that is symmetrical to the fixed, symmetrical angles of the front wing and the rear wing.

15. The propulsion system of claim 9, wherein each rotor of the plurality of rotors may selectively be deactivated during operation of the propulsion system to increase an efficiency level of each respective rotor.

16. A propulsion system for an aerial vehicle, comprising:
a fuselage assembly, including:
a body defining a longitudinal axis; and
a set of arms extending from the body;
a pair of wings disposed on opposite ends of the body of the fuselage assembly, the pair of wings extending outwards from the body in opposing directions at fixed, symmetrical angles ranging between 15 degrees to 80 degrees relative to the longitudinal axis; and a thruster assembly configured to generate an airflow, including:

a plurality of rotors affixed to the arms of the fuselage assembly, the plurality of rotors disposed between the pair of wings; and at least one electric motor configured to power the plurality of rotors, wherein the thruster assembly is configured to:

in a first phase, generate vertical flight, wherein the thruster assembly produces a greater lifting force than a thrusting force;

in a second phase, generate a transition between vertical flight and horizontal flight, wherein the thruster assembly accelerates a rate of rotation of a subset of the plurality of rotors, altering a pitch angle of the aerial vehicle; and in a third phase, generate forward horizontal flight, wherein the wings are each respectively positioned at an optimal angle of attack, wherein a relative position between the fuselage assembly, the pair of wings, and the thruster assembly remains unchanged during operation of the propulsion system, and wherein the plurality of rotors includes:

front rotors affixed to the front section of the fuselage assembly, the front rotors disposed above the upper surface and alongside the trailing edge of the front wing; and rear rotors affixed to the rear section of the fuselage assembly, the rear rotors disposed below the lower surface and alongside the leading edge of the rear wing.

17. The propulsion system of claim 16, wherein producing vertical thrust causes the propulsion system to:

produce a depression on the upper surface of the front wing, by the front rotors; and amplify a pressure on the lower surface of the rear wing, by the rear rotors.

18. The propulsion system of claim 17, wherein producing horizontal thrust causes the propulsion system to:

produce a depression on an upper surface of the fuselage assembly, by the rear rotors; and amplify a pressure against a lower surface of the fuselage assembly, by the front rotors.

19. The propulsion system of claim 18, wherein the fuselage assembly further includes a first chord defined by a leading edge and a trailing edge of the body, the first chord parallel to a second chord defined by the leading edge and the trailing edge of each respective wing, wherein during the third phase, the optimal angle of attack of each respective wing is parallel to a frontal airflow.

20. The propulsion system of claim 16, wherein the plurality of rotors each define a rotation plane, and wherein an angle between each respective rotation plane and the pair of wings ranges from between 110 degrees to 160 degrees.

21. The propulsion system of claim 16, wherein the pair of wings further include:

a front wing disposed on a front section of the fuselage assembly; and a rear wing disposed on a rear section of the fuselage assembly, wherein each respective wing has an airfoil profile and includes an upper surface, a lower surface, a leading edge, and a trailing edge.

22. The propulsion system of claim 16, wherein each rotor of the plurality of rotors may selectively be deactivated during operation of the propulsion system to increase an efficiency level of each respective rotor.

* * * * *